United States Patent [19]

Christenson et al.

[11] Patent Number: 4,581,111
[45] Date of Patent: Apr. 8, 1986

[54] TREATMENT OF ULTRAFILTRATE BY ELECTRODIALYSIS

[75] Inventors: Roger M. Christenson, Gibsonia; Donald D. Emmonds, Ford City; Matthew S. Scott, Pittsburgh, all of Pa.

[73] Assignee: PPG Industries, Inc., Pittsburgh, Pa.

[21] Appl. No.: 594,183

[22] Filed: Mar. 28, 1984

[51] Int. Cl.$^4$ ............... C25D 21/22; C25D 21/18
[52] U.S. Cl. ..................... 204/182.1; 204/180.8; 204/300 EC
[58] Field of Search .... 204/300 EC, 181 N, DIG. 13, 204/180 P, 299 EC, 130

[56] References Cited

U.S. PATENT DOCUMENTS

| | | | |
|---|---|---|---|
| 3,470,044 | 9/1969 | Radimer | 156/642 |
| 3,663,405 | 5/1972 | Christenson et al. | 204/181 |
| 3,663,406 | 5/1972 | LeBras et al. | 204/181 |
| 3,766,049 | 10/1973 | Smith | 204/180 P |
| 4,003,819 | 1/1977 | Kunkle et al. | 204/300 EC |
| 4,149,946 | 4/1979 | Burke | 204/180 P |
| 4,294,677 | 10/1981 | Sakagami et al. | 204/300 EC |
| 4,331,525 | 5/1982 | Huba et al. | 204/300 EC |

FOREIGN PATENT DOCUMENTS

| | | | |
|---|---|---|---|
| 48-4927 | 2/1973 | Japan | 204/300 EC |
| 77920 | 1/1980 | Japan. | |
| 124101 | 4/1980 | Japan. | |

Primary Examiner—Howard S. Williams
Attorney, Agent, or Firm—William J. Uhl

[57] ABSTRACT

A process for electrodialyzing ultrafiltrate and an electrodialysis cell for use in the process are disclosed. The ultrafiltrate contains ionic materials which form a deposit on at least one of the electrodes of the electrodialysis cell impairing the electrical efficiency of the cell. This problem is overcome by removing the deposited electrode from the cell while simultaneously replacing it with electrode relatively free of deposit, thereby restoring the electrical efficiency of the cell. The invention is particularly useful for treatment of the ultrafiltrate of an electrodeposition bath.

13 Claims, 3 Drawing Figures

TREATMENT OF ULTRAFILTRATE BY ELECTRODIALYSIS

BACKGROUND OF THE INVENTION

1. Field of the Invention:

The present invention relates to the process of electrodialysis and to electrodialysis cells. More particularly, the invention relates to the use of electrodialysis to treat ultrafiltrate.

2. Brief Description of the Prior Art:

U.S. Pat. No. 3,663,405 discloses the treatment of an electrodeposition bath with ultrafiltration. In the ultrafiltration process, the desirable components of the electrodeposition bath, mainly resin and pigment, are concentrated on the ultrafiltration membrane surface from where they can be recycled to the electrodeposition bath for further use. The objectionable materials which accumulate in the electrodeposition bath, such as impurities introduced into the bath from the articles being coated, resinous decomposition products and excess solubilizing agents, pass through the membrane into the ultrafiltrate and thereby are continuously removed from the bath. A portion of the ultrafiltrate is purged to drain so as to remove the impurities from the system. The remainder of the ultrafiltrate is used for rinsing electrodeposited articles, and the rinse water which contains loosely adhering paint commonly called "drag-out" is returned to the electrodeposition bath.

U.S. Pat. No. 3,663,406 discloses the combined use of ultrafiltration and electrodialysis in treating an electrodeposition bath. In this patent, the electrodialysis is conducted within the confines of the bath. Although practicing electrodialysis within the bath provides excellent control of ionic impurities, it is very expensive and inconvenient. To be effective, it is necessary that one or more electrodialysis units be installed within the bath. If one unit is inactivated, there must be another unit operating, and the units are particularly susceptible to damage. For example, the article being coated often rips the membranes of the unit. Also, the membranes often become clogged with paint which inactivates the unit.

Japanese Patent Applications Nos. 77920/1978 and 124101/1978 disclose the combined use of ultrafiltration and electrodialysis to treat an electrodeposition bath but in which the electrodialysis cell is placed outside of the electrodeposition bath to treat the ultrafiltrate. Although using electrodialysis in this manner avoids some of the problems encountered when the electrodialysis cell is positioned inside of the bath, it creates other problems. It has been found that ionic materials in the ultrafiltrate can form a deposit on one of the electrodes impairing the electrical efficiency of the cell.

SUMMARY OF THE INVENTION

In accordance with the present invention, a process for electrodialyzing ultrafiltrate such as the ultrafiltrate of an electrodeposition bath and an electrodialysis cell for conducting the process are provided. The process comprises passing electric current through an electrodialysis cell which is in contact with the ultrafiltrate. The electrodialysis cell comprises an anode and a cathode in which one or both of the electrodes is separated from the ultrafiltrate and from the other electrode by a membrane. The ultrafiltrate contains ionic materials which form a deposit on one of the electrodes impairing the electrical efficiency of the cell. In the process of the invention, the deposited electrode is removed from the electrodialysis cell while simultaneously replacing the cell with electrode relatively free of deposits, thereby restoring the electrical efficiency of the cell.

DETAILED DESCRIPTION

Figure 1:
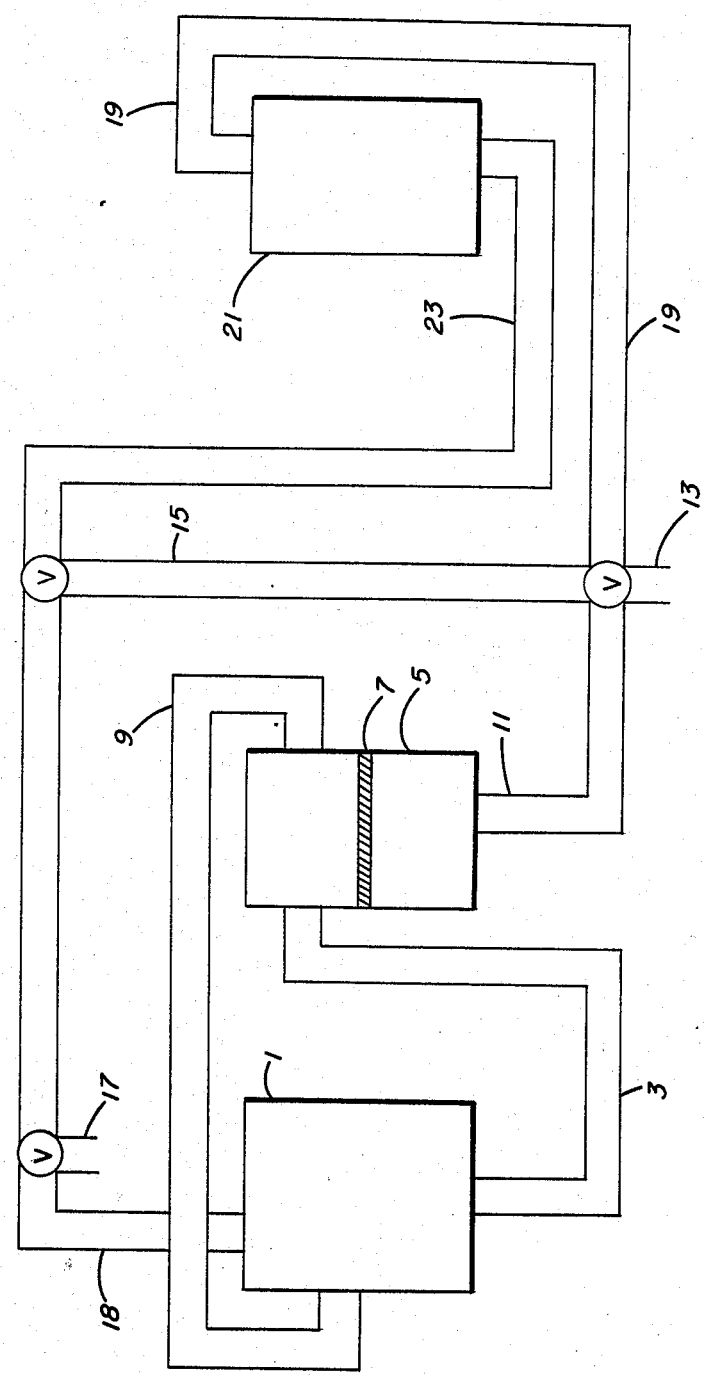
FIG. 1 is a schematic drawing showing the combined use of ultrafiltration and electrodialysis in treating an electrodeposition bath.

The process of electrodeposition is well known in the art and does not in itself form a part of this invention. Generally, an aqueous electrodeposition paint is placed in contact with an electrically conductive anode and an electrically conductive cathode, and upon the passage of electric current, usually direct current between the anode and the cathode, while immersed in the electrodeposition paint, an adherent film of paint is deposited on either the anode or the cathode, depending upon the ionic character of the paint used. The electrodeposition process parameters may vary widely. The voltage applied may vary from as low as, for example, 1 volt to as high as about 500 volts or higher. However, typically, the voltage ranges from 50 to 400 volts. Generally, the electrode employed may be any electrically conductive surface such as steel, aluminum or copper. Also, treated metal surfaces such as galvanized steel and phosphated steel may also be used.

A wide variety of paints may be used in the process. The paints may be anionic or cationic in nature. The ionic character of the paint is usually imparted by the resinous binder used in formulating the paint. A wide variety of electrodepositable resinous binders are known in the art. Anionic resinous binders usually contain pendant carboxylic acid groups which are neutralized with a base such as an amine. Examples of such resinous binders are described in U.S. Pat. Nos. 3,441,489; 3,422,044; 3,403,088; 3,369,983 and 3,366,563.

Cationic resinous binders are also well known in the art and are a class of resins to which the practice of the invention is particularly useful. These resins usually contain pendant amine groups which are neutralized with an acid such as an organic acid, for example, acetic acid or latic acid, to form cationic salt groups. Examples of cationic electrodepositable compositions which are used industrially are described in U.S. Pat. Nos. 4,031,050 and 4,190,567, DE-OS No. 2,752,555 and European Patent Application No. 12463.

Besides water, the electrodepositable resins are in combination with pigments, crosslinkers, inhibitors and organic co-solvents to form the electrodeposition paints. Lead-containing pigments such as lead silica chromate, basic lead silicate, lead chromate, and lead sulfate are often used in electrodeposition paints because of the excellent corrosion resistance they impart to the electrocoated article. However, the acid used in cationic electrodeposition baths often solubilizes the portion of the lead pigment forming lead salts which are soluble in the aqueous phase of the electrodeposition bath. Examples of suitable salts would be lead acetate and lead lactate. Also, it is often desirable to add soluble lead salts directly to the electrodeposition bath to improve the corrosion resistance of the electrocoated articles. See, for example, U.S. Pat. No. 4,115,226.

It has been found that the water-soluble lead salts present in the electrodeposition bath often find their way into the ultrafiltrate of the bath. When the ultrafiltrate of the bath is subjected to electrodialysis, these soluble lead salts form a deposit on the cathode of the electrodialysis cell. This deposit is believed to be principally insoluble lead. The deposit impairs the electrical efficiency of the electrodialysis cell. Prior to the present invention, it was necessary to cut off the flow of ultrafiltrate to the cell, disassemble the cell and replace the deposited electrode. In the present invention, the deposited electrode is removed from the cell while simultaneously replacing the cell with fresh electrode surface. By this process, the electrical efficiency of the cell is restored without having to take the cell out of operation.

The invention is effective in removing not only ionic inorganic materials such as metallic lead but also ionic organic materials which deposit on one of the electrodes. These ionic organic materials can be resinous decomposition products or they can be resinous binder of the electrodeposition paint itself. At times, such as after cleaning, the ultrafiltration membrane may rupture slightly. Although the rupture will usually heal itself in a short period of time, a small amount of the electrodeposition paint will pass into the ultrafiltrate as evidenced by its cloudy appearance. It has been found that treating the ultrafiltrate with electrodialysis in accordance with the present invention causes the paint to deposit on one of the electrodes where it can be removed from the system and clarify the ultrafiltrate.

The process of ultrafiltration as used to treat an electrodeposition bath is relatively simple and well known in the art. The contents of the electrodeposition bath are confined under pressure in contact with an appropriate ultrafiltration membrane supported on a porous support. Any membrane or filter having chemical integrity to the system being separated and having the desired separation characteristics may be employed. In the process of ultrafiltration, resin and pigments are retained on the ultrafiltration membrane and usually are recycled to the electrodeposition bath, whereas water and organic solvents which are miscible with the water and which have a molecular size approximating that of water pass through the membrane along with low molecular weight ionic materials. A suitable apparatus for conducting ultrafiltration is described in U.S. Pat. No. 3,495,465.

The pressures for conducting the ultrafiltration are not severe. The maximum pressure depends in part on the strength of the filter. The minimum pressure is that pressure required to force water and low molecular weight solute through the filter at a measurable rate. As practiced industrially, ultrafiltration is operated usually at about 35–150 psi, usually at about 50–100 psi. Under most circumstances, the ultrafilter will have an initial flux rate of at least 8 gallons per square foot of membrane surface per day and maybe even as high as 40 gallons per square foot of membrane surface per day.

In accordance with the invention, the ultrafiltrate is passed to an electrodialysis unit. Electrodialysis is a species of dialysis which, by definition, is the separation of solutes by means of their unequal diffusion rate through a membrane. In electrodialysis, the passage of material through the membrane is accelerated by electromotive force. The membranes employed in electrodialysis are frequently referred to as "semi-permeable membranes" and are interposed between the electrodes and separate at least one of the electrodes from the ultrafiltrate. The nature of the membrane determines which molecular species can pass and which are held back. Thus, preparation and selection of suitable membranes is of particular importance. A variety of membranes may be employed in the electrodialysis process as used in the present invention. These include conventional dialysis membranes such as regenerated cellulose on fabrics or felts, films of polyvinyl compounds, as well as membrane materials which are not usually considered as dialysis membranes but which produce the desired electrodialysis when employed in the electrodeposition process. Among the useful membranes are those comprised of woven or unwoven cloth including various natural or synthetic fibers such as disclosed in U.S. Pat. No. 3,496,083.

Besides the membranes mentioned above which are non-ion selective, selectively permeable ion exchange membranes may also be used. Using an ion exchange membrane has advantages over using a non-ion selective dialysis membrane in that ion exchange membranes normally have a lower electrical resistance than non-ion exchange membranes and permit faster and more efficient passage of ions of opposite charge through them. For a more complete description of ion exchange membranes in dialysis, reference is made to U.S. Pat. No. 3,419,488.

The electrodialysis cell used in the practice of the present invention comprises a metal or plastic superstructure of rectangular or cylindrical shape. Besides the semi-permeable membranes described above, the cell also contains an anode and a cathode which are centrally located within the cell. One of the electrodes is a continuous member which is removable as is described in detail below in connection with FIGS. 2 and 3. The other electrode is the stationary electrode which is separated from the ultrafiltrate and the other electrode by the semi-permeable membrane. This area of the electrodialysis cell is referred to as the stationary electrode compartment. The electrode compartment contains an electrolyte commonly called flushing liquor which is usually a water solution. The flushing liquor and ultrafiltrate do not intermix because of the semi-permeable membrane. The ionic impurities pass from the ultrafiltrate to the washing liquor, through the semi-permeable membrane. To prevent accumulation of ions, periodic or continuous flushing of the electrode compartment is usually provided.

Referring now to the drawings, FIG. 1 shows an electrodeposition bath 1 which contains the paint used in electrodeposition. The electrodeposition bath contains suitable apparatus for depositing films on articles being coated in the bath. This apparatus is not shown in FIG. 1. A portion of the electrodeposition bath is continuously or intermittently withdrawn through the outlet line 3 to an ultrafiltration apparatus 5. By the process of ultrafiltration, water, low molecular weight impurities which include inorganic and organic ionic materials, such as metallic ions and ionic resinous decomposition products, and solubilizing agent pass through the ultrafiltration membrane 7. The concentrate or retentate which comprises the high molecular weight resinous binder and pigment is retained on the ultrafiltration membrane surface and is usually returned to the bath through line 9. The ultrafiltrate is removed from the ultrafilter through outlet line 11. A portion of the ultrafiltrate may be directed either unidirectionally or proportionately in either an intermittent or continuous fashion to drain 13 or recycled to the electrodeposition bath through line 15. A portion of the ultrafiltrate can be used for rinsing electrodeposited articles at rinsing station 17 or simply returned to the electrodeposition bath through line 18. A portion of the ultrafiltrate is passed through line 19 to the electrodialysis unit 21. The ultrafiltrate which has been subjected to electrodialysis is returned to the electrodeposition bath through line 23. The electrodialyzed ultrafiltrate can be used for rinsing or returned to the electrodeposition bath without rinsing.

Figure 2:
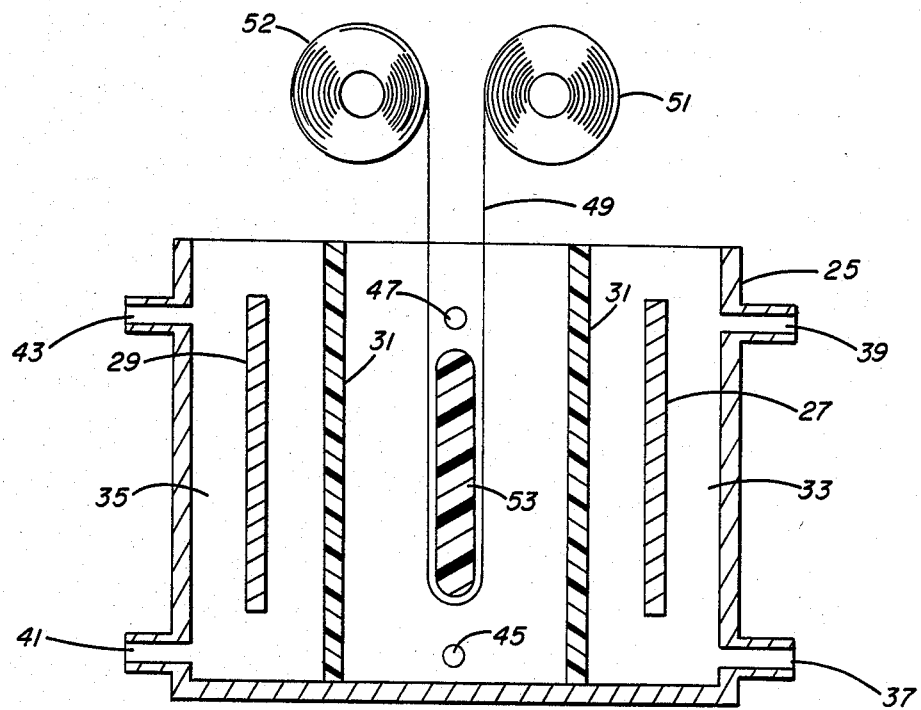
FIGS. 2 and 3 are schematic elevational views of electrodialysis cells of the present invention.
Figure 3:
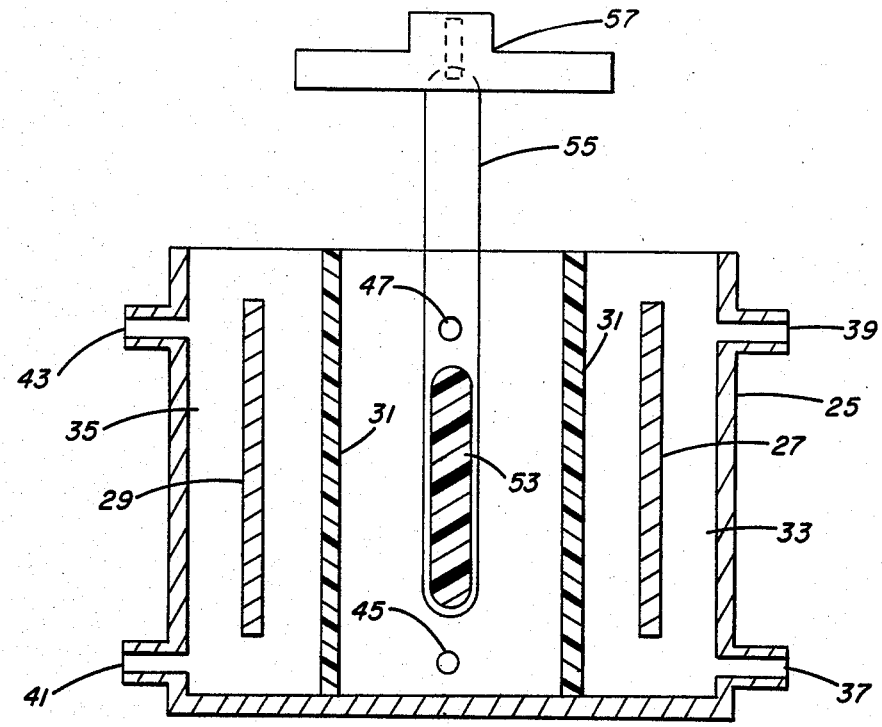

FIGS. 2 and 3 show the electrodialysis cell 25 useful in the practice of the present invention. The cell comprises stationary electrodes 27 and 29 which are of the same polarity and may be either anodes or cathodes depending on the ionic materials which are to be removed from the ultrafiltrate. The stationary electrodes are separated from the ultrafiltrate by semi-permeable membrane 31 which, along with the walls of the electrodialysis cell, form electrode compartments 33 and 35. Inlet lines 37 and 41 and outlet lines 39 and 43 are provided to flush the electrode compartments with a flushing liquid such as deionized water or a mixture of deionized water and ultrafiltrate. Ultrafiltrate enters the cell at 45, passes over the movable electrode 49 and passes out of the cell at 47. As shown in FIG. 2, the movable electrode 49 can be in the form of a continuous length of metal foil which is unraveled from stock roll 51, passing over and around guide member 53 with the foil being taken up on roll 52 for eventual disposal. As shown in FIG. 3, the electrode can be in the form of a continuous belt which passes into the ultrafiltrate, around guide member 53 and through cleaning station 57 before re-entering the ultrafiltrate. The cleaning station 57 removes deposits which form on the electrode 55 during the electrodialysis operation. The cleaning station can be a solvent bath or brushes which will remove the deposit from the electrode. The continuous movable electrode can pass in a continuous or intermittent manner through the electrodialysis cell. As the movable electrode is removed, fresh electrode is simultaneously supplied to the cell.

Although the invention has been described in connection with the treatment of ultrafiltrate of an electrodeposition bath, the invention is also applicable to the treatment of other ultrafiltrates which contain ionic materials such as the ultrafiltrates of electroplating baths.

We claim:

1. In a process of electrodialyzing an ultrafiltrate of an electrodeposition bath comprising passing electric current through an electrodialysis cell which is in contact with the ultrafiltrate, the electrodialysis cell comprising an anode and a cathode, whereby at least one of the electrodes is separated from the ultrafiltrate and the other electrode by a membrane, characterized in that the ultrafiltrate being electrodialyzed contains ionic materials which deposit on at least one of the electrodes impairing the electrical efficiency of the cell, the process comprising removing the deposited electrode from the electrodialysis cell while simultaneously replacing the cell with electrode relatively free of deposit thereby restoring the electrical efficiency of the cell.

2. The process of claim 1 in which the ultrafiltrate contains cationic materials which deposit on the cathode.

3. The process of claim 1 in which the ultrafiltrate contains metallic ions.

4. The process of claim 3 in which the ultrafiltrate contains lead ions.

5. The process of claim 1 in which the ultrafiltrate contains ionic organic materials which deposit on the electrode which is removed.

6. The process of claim 1 in which the electrode is removed from the cell, cleaned and returned to the cell in a continuous manner.

7. The process of claim 1 in which the electrode is removed from the cell, disposed of and fresh electrode supplied to the cell.

8. The process of claim 1 in which the electrode is in the form of metal foil which is fed to the cell as the deposited cathode is removed from the cell.

9. An electrodialysis cell comprising an anode and a cathode separated from one another by a membrane characterized in that the cell comprises a means of removing one of the electrodes while simultaneously replacing the cell with fresh electrode, said removable electrode being a continuous member.

10. The electrodialysis cell of claim 9 in which the removable electrode is in the form of a continuous length of metal foil.

11. The electrodialysis cell of claim 9 which is in the form of an endless belt.

12. The electrodialysis cell of claim 10 in which the metal foil is supplied to the electrodialysis cell from a stock roll and is removed from the cell on a take-up roll.

13. The electrodialysis cell of claim 11 in combination with a cleaning station through which the endless belt passes.

* * * * *